United States Patent
Antonio et al.

(10) Patent No.: US 8,538,322 B1
(45) Date of Patent: Sep. 17, 2013

(54) TRANSMIT AND ADMISSION CONTROL FOR CDMA SATELLITE COMMUNICATION SYSTEM

(75) Inventors: Franklin P. Antonio, Del Mar, CA (US); Ilan Kessler, Haifa (IL); Ze'ev Roth, Nesher (IL); Ephraim Zehavi, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 09/027,992

(22) Filed: Feb. 23, 1998

(51) Int. Cl.
*H04H 20/74* (2008.01)

(52) U.S. Cl.
USPC ........ 455/3.02; 455/522; 455/13.4; 455/12.1; 455/427; 455/453; 370/252; 370/347; 370/445; 370/447; 370/461

(58) Field of Classification Search
None
See application file for complete search history.

(56) References Cited

U.S. PATENT DOCUMENTS

| | | | |
|---|---|---|---|
| 5,481,561 A * | 1/1996 | Fang | 370/320 |
| 5,729,542 A * | 3/1998 | Dupont | 370/346 |
| 5,732,328 A * | 3/1998 | Mitra et al. | 455/69 |
| 5,907,813 A | 5/1999 | Johnson, Jr. et al. | |
| 5,924,015 A * | 7/1999 | Garrison et al. | 455/13.4 |
| 6,072,990 A * | 6/2000 | Agrawal et al. | 455/69 |
| 6,195,338 B1 * | 2/2001 | Decker | 370/252 |

* cited by examiner

*Primary Examiner* — Yuwen Pan
*Assistant Examiner* — Fanghwa Wang
(74) *Attorney, Agent, or Firm* — Ashish L. Patel

(57) ABSTRACT

A system for performing transmit power and admission control for a satellite based wireless communication systems. Admission control uses centralized admission and distributed admission controls. Centralized admission control uses a maximum persistence value broadcasted from a hub to terminals. Persistence is the probability that a transmission will timely occur. Each terminal transmits a persistence that is no greater than the maximum persistence value. If the transmission fails, the transmission is repeated using the same probability. Lowering the persistence introduces a delay for alleviating congestion. Power control is performed using centralized and distributed power control. Centralized power control uses power control commands transmitted from the hub to each terminal. When an acknowledge is not received, a backoff and recovery procedure is performed. Distributed power control is performed during the recovery process when a terminal fails to receive an acknowledgment message after a predetermined number of attempts.

22 Claims, 9 Drawing Sheets

US 8,538,322 B1

TRANSMIT AND ADMISSION CONTROL FOR CDMA SATELLITE COMMUNICATION SYSTEM

BACKGROUND OF THE INVENTION

I. Field of the Invention

The present invention relates to wireless communications. More particularly, the present invention relates to a novel and improved method and apparatus for performing transmit and admission control in a satellite based wireless communication system.

II. Description of the Related Art

FIG. 1 is a highly simplified diagram of a satellite based telecommunications system. Wireless satellite telecommunications systems are typically used to exchange between to remote points For example, credit verification information may be exchanged between the point of sale and a master credit history database using a wireless satellite telecommunications system.

During operation of the wireless satellite telecommunications system, earth bound terminals 50 exchange data messages with hub 52 via radio frequency signals relayed from satellite 54. The signals transmitted from hub 52 are referred to as the forward link and the signals transmitted from terminals 50 are referred as the reverse link. The use of a satellite allows remotely located terminals without line of sight access to communication with one another. Colocated terminal 51 is coupled to hub 52 and facilitates measurement of various characteristics about transmission channel to and from satellite 54.

Many satellites have been placed into geostationary orbit around the earth to implement satellite telecommunications systems. A geostationary orbit is one in which the satellite remains above the same location on the earth's surface at all times. In general, the geostationary satellites used to operate wireless satellite messaging systems are placed 2° apart in the sky to maximize the number of satellites available. This relatively close proximity can cause transmissions directed at one particular satellite to generate interference that is detected by adjacently located satellites. This is particularly true with the use of ultra-small aperture antennas (typically 18 inch), which focus the transmission to a reduced degree, but which are highly desirable because they can be conveniently placed in a greater number of locations. To ensure that each satellite operates properly, various governmental standards bodies limit the peek interference that a wireless system can generate to adjacent satellites.

This limitation on the peak interference makes it desirable to use code division multiple access (CDMA) signal processing techniques in a satellite communication system because CDMA signal processing spreads the RF energy transmitted across a larger amount of bandwidth than other data transmission technologies. Spreading the RF energy across a wider RF bandwidth reduces the energy density at any particular frequency, which is the way in which the peak energy level is generally measured. Thus, the use of CDMA signal processing allows a greater amount of energy to be transmitted, and therefore a greater number of communications to be conducted, while complying with international standards of operation. Thus, the use of CDMA signal processing facilities the use of ultra-small aperture antennas, which tend to "spill" power over to the next satellite more readily.

Other factors also must be considered when implementing a satellite based telecommunications system including the average amount of delay that for the transmission of data messages. Also it is desirable to operate a CDMA based satellite communications system as efficiently as possible, since RF bandwidth is a limited resource. Thus, the present invention is directed to performing transmit power control and admission control for a satellite based CDMA communication system that provides efficient use of the available RF bandwidth while transmitting data messages with acceptable delay, and which complies with Federal Communication Commission (FCC) regulations, as well as the regulations of other standards bodies, regarding interference with adjacent satellites when performed using ultra-small aperture antenna dishes.

SUMMARY OF THE INVENTION

The present invention is a novel and improved method and apparatus for performing transmit power and admission control for a satellite based wireless communication system. In a preferred embodiment of the invention, the efficiency of the satellite based telecommunications system is optimized while keeping the transmission delay acceptable by maintaining a high probability of successful first reception of all data messages even when multiple messages are transmitted simultaneously. Maintaining a high likelihood of successful first reception increases efficiency by reducing the number of retransmissions necessary. Efficiency is further increased by having the data messages from each terminal received by the hub with an equal power.

To provide high "first attempt success probability" the transmit power at which the data messages from each terminal are received is maintained at a sufficient level to allow proper decoding of all messages even when a predetermined maximal number of terminals transmit concurrently. The maximal number of terminals is denoted by $M_{nom}$ and the receive power level is denoted by $P_{nom}$. By keeping the transmit power at which data messages are received at $P_{nom}$ the present invention ensures that data message will be received properly in the cases in which up to $M_{nom}$ terminals transmit simultaneously, keeping the number of retransmissions as well as the average message delay small.

To meet government regulations the maximal number of terminals $M_{nom}$ and the receipt power $P_{nom}$ are constrained so that the interference with adjacent satellite is kept lower than the FCC limits. $P_{nom}$ and $M_{nom}$ are selected as described below so that the received bit-energy to noise ratio ($E_b/N_o$) is sufficient to allow a high likelihood of proper first reception while meeting governmental regulations. Mathematically the above can be described as a constrained maximization problem where the number of terminals M is to be maximized relative to the transmit power P subject to two constraints:

$$M*P < FCC\_LIMIT \qquad (I)$$

$$(W/R)*(P/(M-1)*P+N_t) > (E_b/N_t)_{required} \qquad (II)$$

W is the spreading bandwidth and R is the data transmission rate. $N_t$ is the combined thermal noise and interference from other terminals. The result yields $M_{nom}$ and $P_{nom}$. It should be noted that $M_{nom}$ is not the actual throughput of the system because the maximum throughput cannot be achieved due to the stochastic nature of the message arrival process whereby a few terminals may transmit at one time and many terminals may transmit at another time. The number of terminals that will transmit at a given time can not be predicted.

The maximal number of simultaneously transmitting terminals the system can support $M_{nom}$ is calculated in this manner, and the system throughput is maximized by having each terminal received with sufficient power so that when the number of concurrent transmitting terminals is the maximum $M_{nom}$, the Eb/No will be ample enough to allow proper decoding. Thus, the system operates properly and efficiently even in the worst case transmission scenario.

In accordance with a preferred embodiment of the invention, admission control is performed using a combination of centralized admission control and distributed admission control. The centralized admission control incorporates the use of a maximum persistence value (Per_Max) that is broadcast from a hub to a set of terminals. Each terminal then transmits with a persistence (Tx_Per) that is no greater than the maximum persistence value Per_Max.

The persistence is the probability that a transmission will occur at a given transmit time. If the transmission does not occur at the given transmit time, the transmission is attempted at the next designated transmit time using the same probability. Thus, lowering the persistence effectively introduces a random delay that can be used to alleviate congestion when many terminals attempt to transmit at the same time. The hub can therefore reduce the rate at which messages are received when congestion is experienced by lowering the maximum persistence Per_Max.

The distributed admission control is achieved by having each terminal monitor for receipt of acknowledgment messages. Acknowledge message are transmitted by the hub in response to successful receipt of a message transmitted by the terminal. When acknowledgment messages are not received the persistence Tx_Per at which the terminal transmits is reduced below the maximum persistence Per_Max. This also serves to reduce congestion, which is often the cause of unacknowledged messages.

Transmit Power control is preferably performed by transmitting power control commands Power_Step from the hub to each terminal. Each terminal then adjusts its transmit power based on the power control command Power_Step. Power_Step is calculated at the hub based on the bit-energy to noise ratio (Eb/N0) of the last message received at the hub from the associated terminal and the number of terminals that transmitted concurrently. This keeps the transmit power of each terminal at the minimum necessary in order to properly conduct communications under full load conditions, and reduces the degree to which the terminals interfere with one another. Each terminal also adjusts it transmit power and persistence in accordance with a predetermined procedure when acknowledgment messages are not received.

FIG. 2 is a block diagram illustrating the operation of hub 52 and an exemplary terminal in accordance with one embodiment of the invention. During operation, hub 52 receives a set of messages from a set of terminals 502 via the reverse link 54. In response to this set of messages load estimator 56 within hub 52 calculates an estimated instantaneous load T 61 and an estimated load $S_w$ 57, and noise estimator 58 calculates the energy-per-bit to noise ratio ($E_b/N_0$) 59. Power control generator 60 generates a power control command (Power_Step) 62 for each terminal using the energy-per-bit to noise ratio ($E_b/N_0$) 59 as well as the estimated instantaneous load T 61. Each power control command Power_Step 62 is then transmitted to the associated terminal within an acknowledgment message 63 transmitted via the forward link signal. Also, admission control system 64 performs centralized admission control by calculating the maximum persistence Per_Max 66 that is broadcast to all terminals, or a set of terminals, via the forward link signal.

Within each terminal 50 a transmit power system 70 receives the Power_Step 62 and a backoff system 74 receives maximum persistence Per_Max 66. Additionally, acknowledge monitor system 78 monitors for the receipt of acknowledgment messages and notifies transmit power system 70 and backoff system 74 when none are received. When acknowledgment messages are received, transmit power system 70 calculates the transmit power (Tx_Power) 72 at which reverse link message are transmitted in response to Power_Step 62. Additionally, backoff system 74 adjusts the persistence Tx_Per 76 at which the terminal transmits messages in response to the maximum persistence Per_Max 66. Transmit system 80 generates the messages and transmits them at the transmit power Tx_Power 72 with the persistence Tx_Per 76. Thus, normal power control is performed when acknowledgment messages are received successfully.

When acknowledgment messages are not received successfully, Tx_Power 72 and the persistence Tx_Per 76 are calculated in accordance with other predefined algorithms that compensate for possible congestion as well as insufficient transmit power at the terminal. Also, if hub 52 detects a sufficiently high number of messages it reduces the value of Per_Max which slows down the arrival of additional messages. When the number of messages received is reduced, hub 52 may increase Per_Max to speed up communications. Thus, localized congestion can be spread out over a greater period of time. If a sufficient number of messages are transmitted from a terminal without acknowledgment from the hub, a failure recovery mode is entered.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
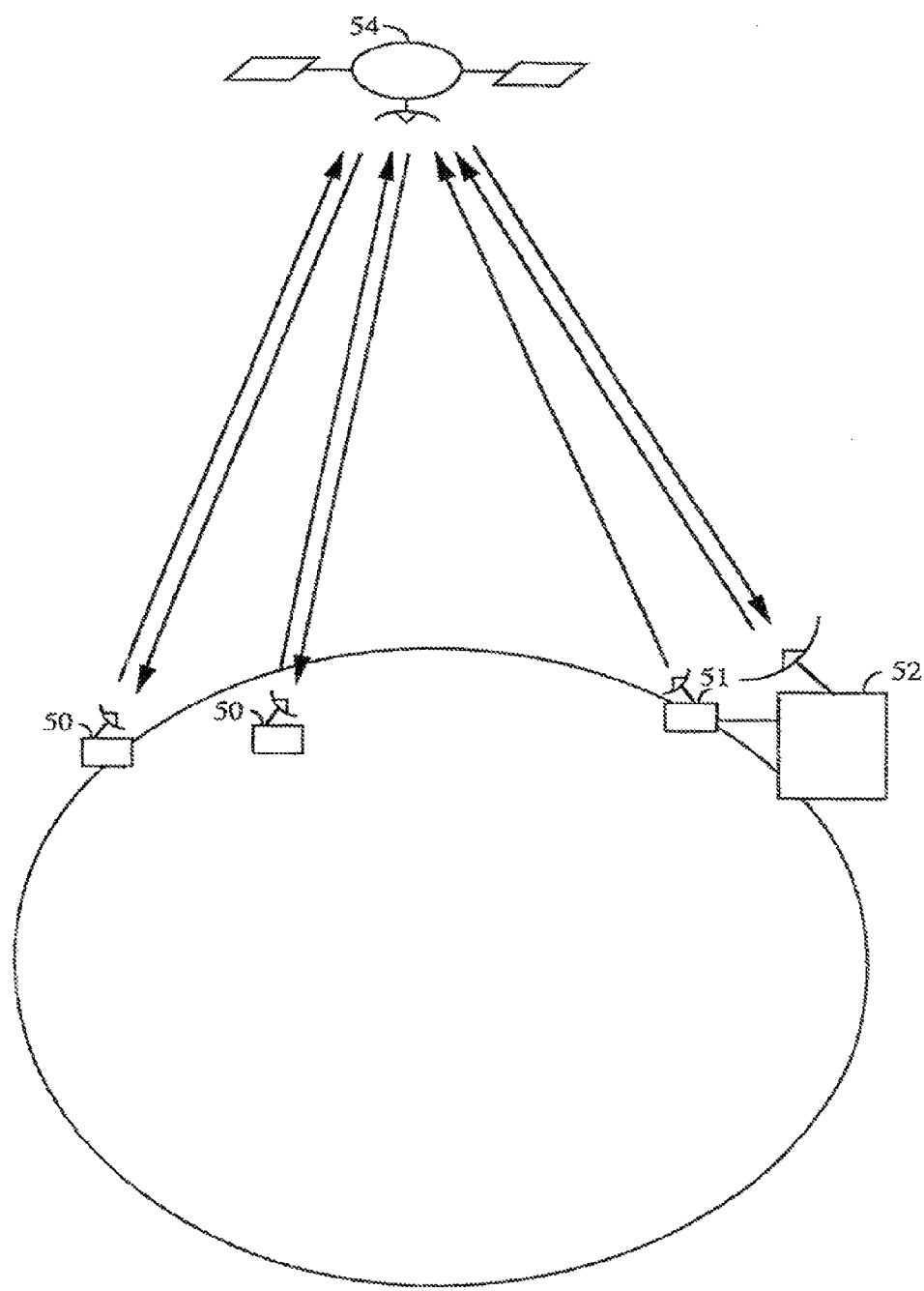
FIG. 1 is a block diagram of a satellite based wireless communications system.

In accordance with one embodiment of the invention, but 52 and terminal 50 are arranged in accordance with FIG. 1. To exchange data and signaling messages, terminals 50 exchange RF signals with hub 52 modulated in accordance with code division multiple access techniques (CDMA) techniques. These RF signals are relayed by geostationary satellite 54 allowing hub 52 to communicate with distant terminals 50. In the preferred embodiment of the invention, a set of RF frequency bands, each referred to as a channel frequency allocation (CFA), is established by convention. Within each CFA, different pseudorandom noise (PN) codes are used to establish channels over which different sets of data can be transmitted by direct sequence modulation of the data before transmission. Upon reception by the receive system, the data is retrieved by demo9dulation of the RF signals using the same set of PN codes. The use of PN codes to establish communication channels is well known in the art of CDMA signal processing.

Within each CFA, a first set of PN codes (access channel codes) are used to create a set of access channels over which data messages and other user data may be transmitted to hub 52 from terminals 50. A second set of PN codes (paging channel codes) are used to create a set of paging channels over which data is transmitted to terminals 50 from hub 52. In a preferred embodiment of the invention, the paging channel codes are comprised of Walsh codes having a length of sixty-four bits, and the access channel codes are comprised of longer codes. Additional codes may also be used including the use of a longer code used in addition to the Walsh codes for the one or more paging channels.

The access channels are processed via the use of 64-ary modulation for which one of sixty-four Walsh symbols, each Walsh symbol being comprised of sixty-four Walsh chips, are transmitted for each six (6) symbols of data. After being modulated with the access channel code, the Walsh symbols are further modulated using spreading codes before being transmitted. To facilitate coding, including interleaving and convolution coding, the data is processed in frames which are comprised of 96 Walsh symbols in the preferred embodiment of the invention.

Within a CFA, the access channels are further grouped into subsets called admission groups. A set of terminals 50 is assigned to each admission group where the number of terminals 50 generally exceeds the number of access channels in the admission group. In the preferred embodiment of the invention, the access channels that make up an admission group are from the same CFA and associated with a predetermined paging channel, however, alternative embodiments of the invention are expected to have admission groups comprised of access channels from different CFA's. At the time of the transmission of a data message, a terminal 50 randomly selects an access channel over which the transmission is to be conducted from the set of access channels in the associated admission group. The terminal then transmits a preamble message followed by the data message on the selected access channel.

Simultaneously, hub 52 searches for transmissions of a preamble message from terminals 50 on each access channel by performing multiple time offset demodulations for the preamble message using the associated access code. The searches are performed periodically during access slots. If hub 52 detects a preamble message, demodulation continues until the data message is retrieved.

In a first embodiment of the invention, if hub 52 detects multiple preamble messages during an access slot, the preamble message received with the greatest strength is processed further, while the remaining data messages are ignored. These ignored messages will be retransmitted at a later time. The use of CDMA signal processing allows at least one message to be processed when a "collision" occurs reduces the number of retransmissions required and therefore increases system performance. Typically, when collisions occur in other types of "aloha" systems all the transmissions fail.

In an alternative embodiment of the invention, a set of access channel processing resources are allocated for each access channel code at hub 52. This allows more than one message to be processed successfully during a collision if the transmissions are time offset by more than duration of a single bit or "chip" of the spreading code. Allowing multiple messages to be processed during the same access slot further reduces the need for retransmissions and therefore further increases the performance of the system.

In one embodiment of the invention, the duration of the time slots associated with a particular access channel may be different for each access channel, and terminal 50 selects the appropriate access channel based on the length of the data message being transmitted.

Figure 3:
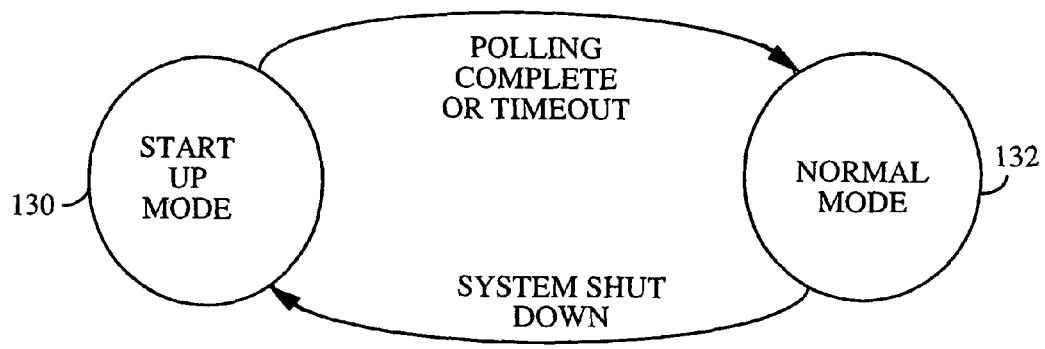
FIG. 3 is a state diagram illustrating the operation of the hub.

FIG. 3 is a state diagram illustrating the state transitions performed by hub 52 in accordance with one embodiment of the invention. As shown in FIG. 3, hub 52 begins operation in start up mode 130. During start up mode 130, hub 52 registers each terminal 50 ready to engage in communication. In a first embodiment of the invention, this registration is done via a polling process during which hub 52 allows terminals 50 to register one admission group at a time. A signaling message broadcast from hub 52 via a paging channel is used to notify terminals 50 that polling is being conducted by hub 52, and the particular admission group allowed to register at any particular instant is indicated via additional signaling messages broadcast from hub 52.

In a second embodiment of the invention, all terminals 50 are allowed to register during start up mode 130 in a random fashion, with the "persistence" level used by each terminal 50 being adjusted by hub 52 via broadcast signaling messages. As each terminal 50 registers, hub 52 updates a database of all terminals 50 presently subscribing for the wireless telecommunication service. When all the terminals 50 in the database have been registered, or when a time-out period has expired, the polling process has been completed and hub 52 enters normal mode 132 during which it performs admission and transmit power control.

The transmission persistence (Tx_Per) is a value between zero and one, inclusive, that determines the probability of a data message actually being transmitted at a given time. That is, at the proper time to transmit a data message to hub 52, a terminal 50 generates a random Boolean value with the probability of being true equal to Tx_Per, and conversely the probability of being false equal to (1−Tx_Per). If a true is generated, the data message is transmitted and if a false is generated the transmission is aborted.

If the transmission is aborted, a new random Boolean value is generated at the next appropriate access slot, and the transmission is once again performed if the new Boolean value is true or aborted if the new Boolean value is false. The process of generating a Boolean value at each transmission time to determine if a particular transmission should occur is repeated until a true is generated, and a transmission occurs. Those skilled in the art will recognize various alternative methods for controlling the rate of transmission including the generation of random delay times.

Figure 4:
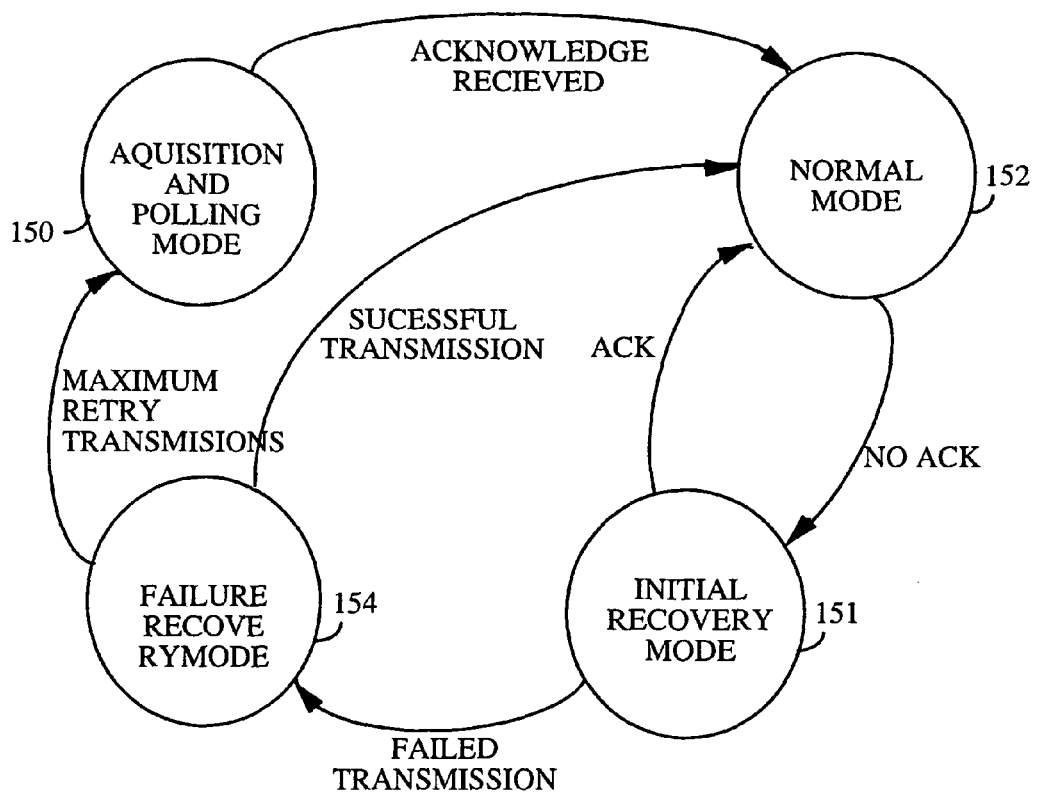
FIG. 4 is a state diagram illustrating the operation of a terminal.

FIG. 4 is a state diagram illustrating the state transitions performed by a terminal 50 when configured in accordance with one embodiment of the invention. When first activated a terminal 50 is in initial acquisition mode 150. During initial acquisition mode 150 the terminal 50 searches for a pilot channel transmitted from hub 52. Once the pilot channel is acquired, terminal 50 proceeds to process other forward link paging channels transmitted from hub 520 which carry additional information. In a first embodiment of the invention, terminal 50 waits until indication via signaling messages from hub 52 has been received that the admission group to which it belongs has been selected, and then transmits one or more access probes to hub 52 until an acknowledgment message from hub 52 is received, or a maximum number of probes have been transmitted.

In another embodiment of the invention, during acquisition mode 150, terminal 50 receives a maximum persistence level from hub 52, and transmits the access probes at that maximum persistence level until an acknowledgment message is received or a maximum number of probes have been transmitted. Upon receipt of an acknowledgment message from hub 52, the terminal 50 enters normal mode 152.

During normal mode 152 terminal 50 conducts bidirectional communications with hub 52. In one embodiment of the invention, this bidirectional communication is comprised of data messages transmitted from terminal 50 and acknowledgment messages transmitted from hub 52 in response to each data message successfully received by hub 52. If a terminal 50 does not receive an acknowledgment message in response to a data message while in normal mode 152, the terminal 50 enters initial recovery mode 151 where it performs a short retransmission sequence. If the retransmission sequence is successful, and therefore an acknowledgment message received, terminal 50 returns to normal mode 1520.

If the short retransmission sequence fails, a failed transmission has occurred and the terminal 50 enters failure recovery mode 154. During failure recovery mode 154, the terminal 50 attempts to reestablish communication with hub 52 via the transmission of additional data messages using a second power control and admission process. If a maximum number of these additional transmissions are made without receipt of an acknowledgment message from hub 52, the failure recovery also fails, and terminal 50 enters initial acquisition mode 150 where it will periodically attempt to register with hub 52 in accordance with the registration procedures described above, so long as a forward link signal from hub 52 is detected.

In a preferred embodiment of the invention, substantially similar failure recovery procedures are performed in both initial recovery mode 151 and failure recovery mode 154, except for the use of an initial random delay in failure recovery mode 154. For example, during each recovery mode TX_MAX retransmission attempts are made. In alternative embodiments of the invention additional failure recovery modes could be added before the terminal enters acquisition an polling mode 150. These additional failure recovery modes could attempt and additional TX_MAX retransmissions, or attempt some alternative number of retransmissions.

Figure 2:
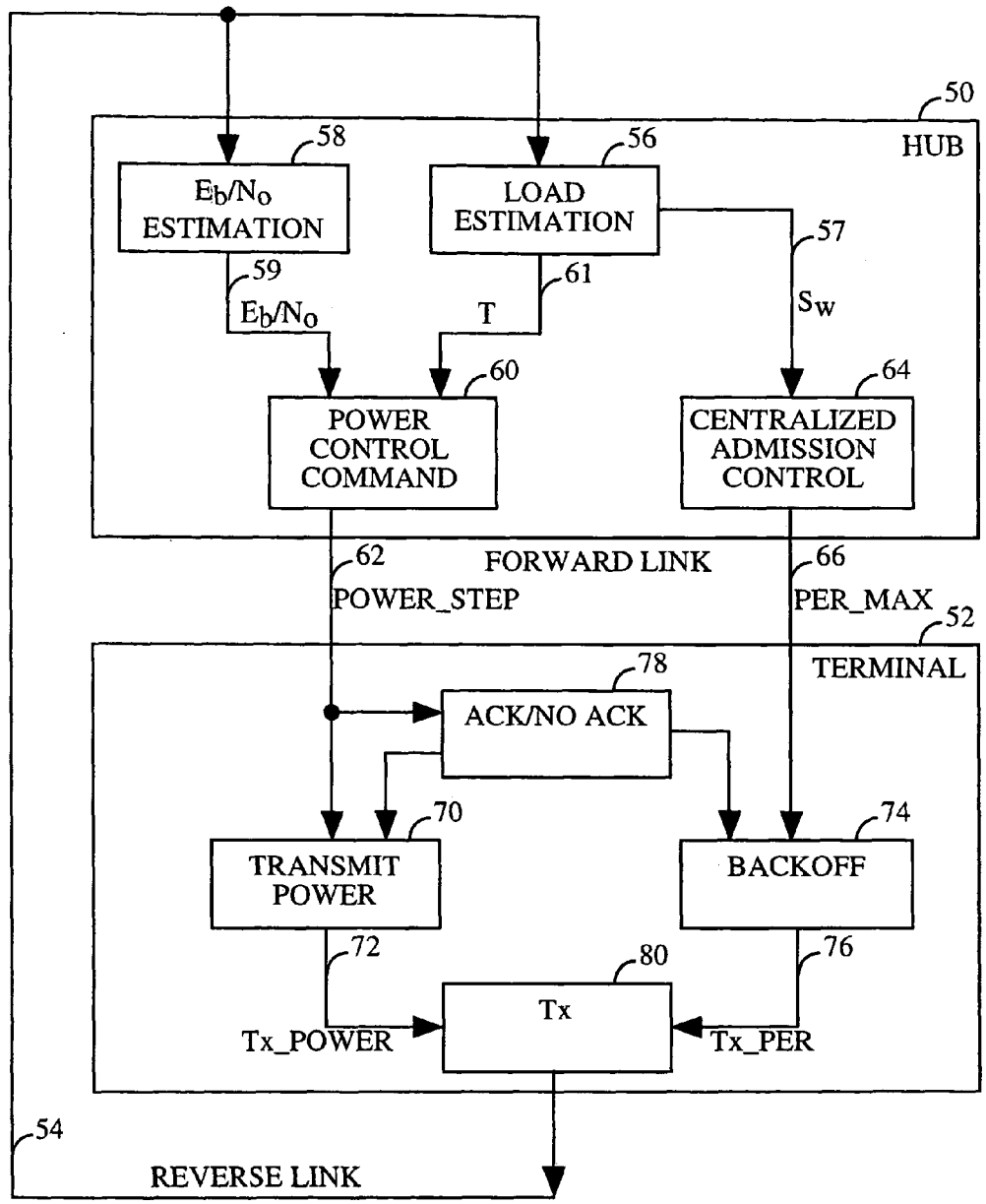
FIG. 2 is a block diagram of a hub and a terminal configured in accordance with one embodiment of the invention.
Figure 5:
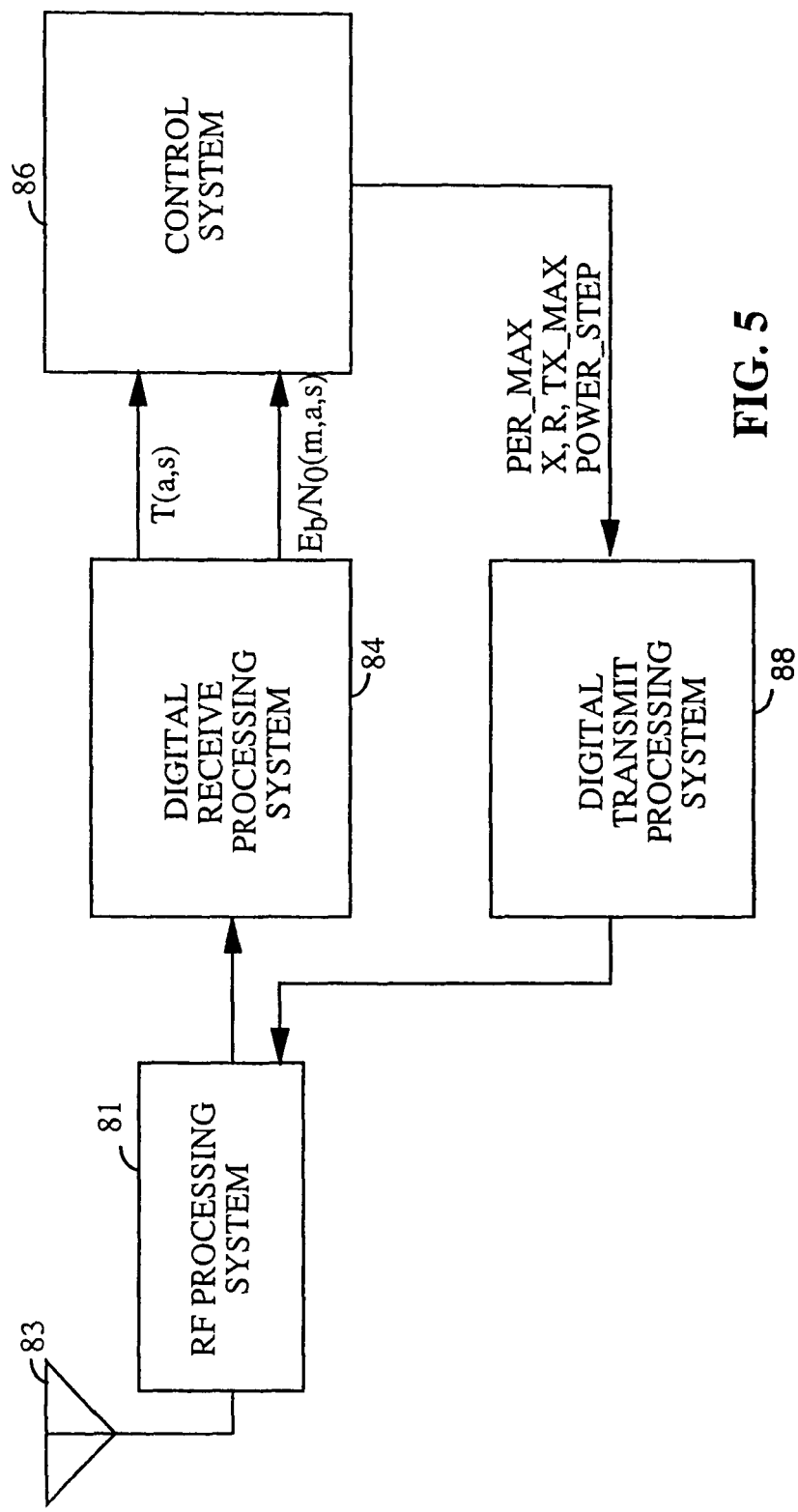
FIG. 5 is a block diagram of the hub.

FIG. 5 is a block diagram of hub 52 when configured in accordance with one embodiment of the invention. RF processing system 8 710 downconverts and digitizes RF signals received from antenna 8 732. Digital receive processing system 8 74 receives the digitized data from RF processing system 8 710 and performs multiple searches on each access channel for access probes. These searches result in a preamble scan array S(a,s) which contains a set of values each indicating the number of preamble messages detected on access channel a during slot s and the magnitude at which each preamble message was received, which are provided to control system 8 76. Additionally, receive processing system 8 74 generates a message bit-energy array $E_b/N_0(m,a,s)$ for each message m. Message bit-energy array $E_b/N_0(m,a,s)$ is the average bit energy to interference ratio at which message m was successfully received on access channel a during slot s at hub 52. ($E_b/N_0$ of FIG. 2)

When hub 52 is in normal mode 132 (FIG. 3), control system 8 76 responds to preamble scan array S(a,s) and message bit-energy array $E_b/N_0(m,a,s)$ by generating a set of values Per_Max, Tx_Max, X and R for each admission group. Values Per_Max, Tx_Max, R and X are then provided to digital transmit processing system 8 78. Additionally, control system 8 76 generates a power control command Power_Step for each terminal 50 to which an acknowledgment message is to be transmitted, and provides a Power_Step value to digital transmit processing system 8 78. Transmit processing systems 8 78 processes the values received from control system 8 76 in accordance with CDMA signal processing techniques to generate CDMA signals which are summed and provided to RF processing system 8 170 for transmission to terminals 50 via antenna 8 732.

Figure 6:
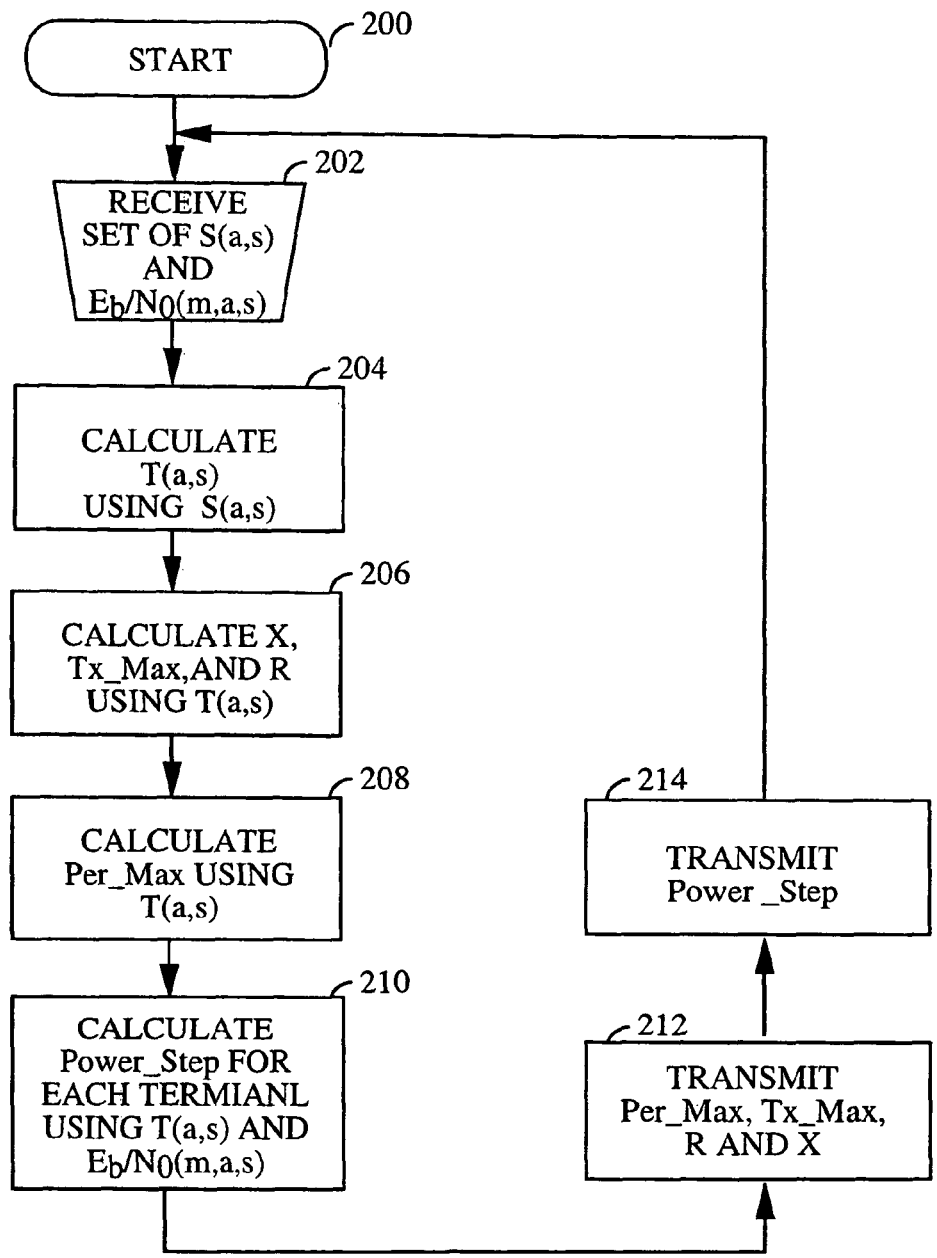
FIG. 6 is a flow diagram illustrating the operation of the hub.

FIG. 6 is a flow chart illustrating the processing performed by control system 76 during normal mode (FIG. 3) to generate the values provided to transmit processing systems 78 as described above, including Per_Max, Tx_Max, X and R, described in greater detail below, as well as a set of power control commands Power_Step. The processing begins at step 200 and at step 202 control system 76 receives preamble scan array S(a,s) and message energy array $E_b/N_0(m,a,s)$ as described above. At step 204, control system 76 updates an instantaneous load array T(a,s) (T of FIG. 2) using preamble scan array S(a,s) by setting T(a,s) to the number of preambles detected for each access channel a during each time slot s above a predetermined threshold.

At step 206 control system 76 calculates X, Tx_Max, and R for each admission group using instantaneous load array T(a,s), and at step 208 Per_Max is calculated for each admission group using array T(a,s). At step 210 a power control command Power_Step is calculated for each terminal 50 for which an acknowledgment message is to be generated using array T(a,s) and $E_b/N_0(m,a,s)$ as described below. At step 212, Per_Max, Tx_Max, R and X are transmitted to the sets of terminals 50 associated with each admission group via introduction to transmit processing systems 78 as described above.

At step 214, the Power_Step value generated for each terminal 50 is transmitted via introduction to transmit processing system 78 as well. Once every acknowledgment message has been transmitted, step control system returns to step 202. The order of the steps 206 to 214 with respect to one another as shown in FIG. 6 is not particularly relevant to the present invention, except that steps 212 must be preceded by steps 206 and 208, and step 214 must be preceded by step 210. Additionally, those steps that are not required to precede one another may be performed in parallel.

Figure 7:
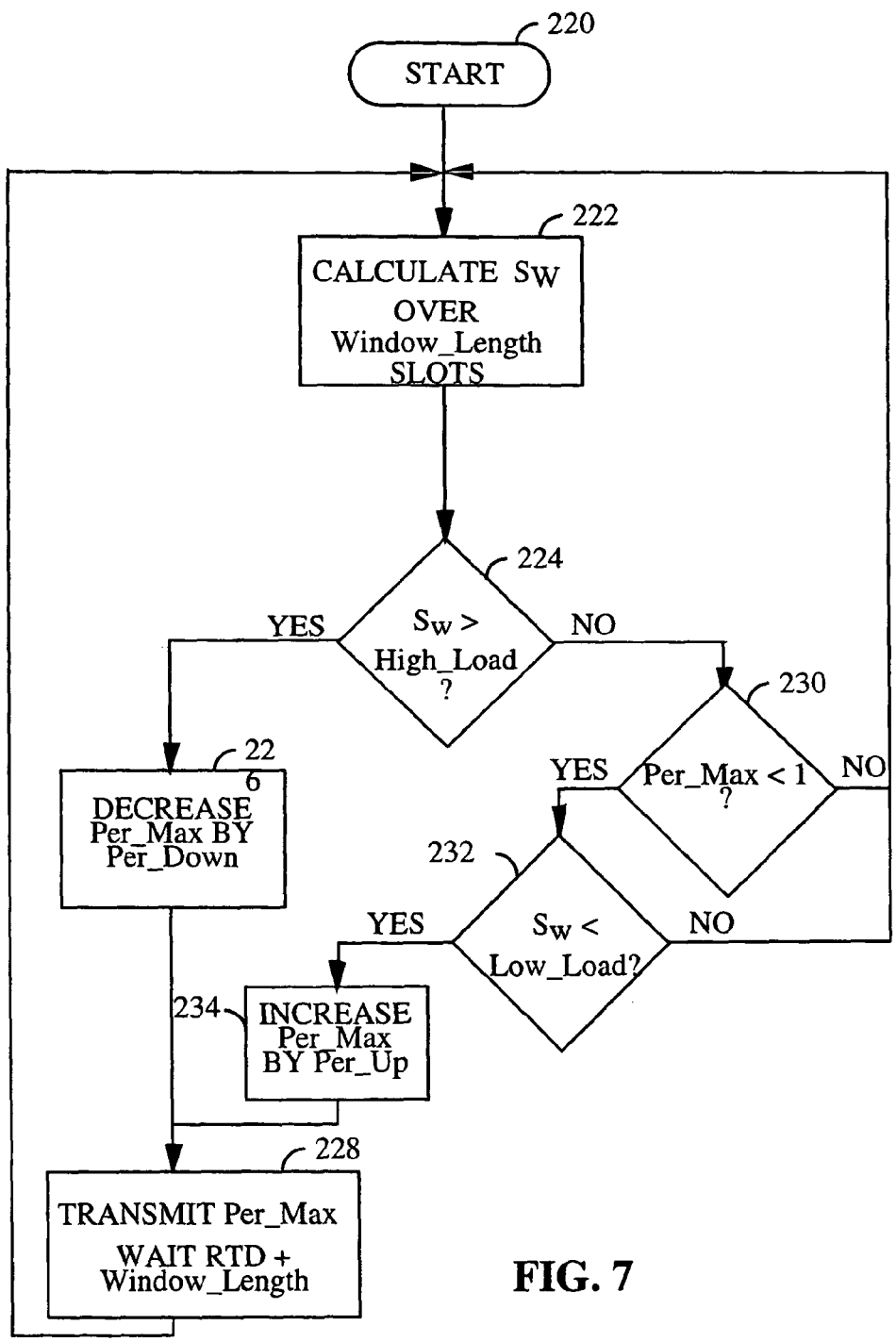
FIG. 7 is a flow diagram illustrating the generation of the maximum persistence command.

FIG. 7 is a flow diagram illustrating the steps performed by control system 76 when calculating Per_Max during step 208 of FIG. 6 in accordance with one embodiment of the invention. The calculation of Per_Max begins at step 220 and at step 222 hub 52 calculates and admission group load ratio $S_w$ over a time window of Window_Length slots as follows:

$$S_w = T_w / R_w \quad (1)$$

where $T_w$ is the total number of transmissions for the access group over a time window having Window_Length slots and $R_w$ is a nominal number of transmissions allowed for steady state operation of the communication system.

$T_w$ is calculated according to the following equation:

$$T_w = \Sigma T_{complete}(a,s) + 1/2 \Sigma T_{partial}(a,s) \quad (2)$$

where 693 $T_{complete}(a,s)$ is the number of transmissions occurring during slots that fall completely within the time window, and $\Sigma T_{partial}(a,s)$ is the number of transmissions occurring during slots that fall partially within the time window. The use of equation (3) to calculate $T_w$ allows the total number of transmissions to be calculated in a system having time slots that are not aligned and which are of different lengths.

$R_w$ is calculated as follows:

$$R_w = \text{Window\_Length} \cdot M_{nom} \cdot Num\_CFA \cdot \text{Beta} \quad (3)$$

where Num_CFA is the number of CFA's associated with the admission group and $M_{nom}$ is the nominal number of transmissions that can be transmitted over a given access channel, and which is described in greater detail below. Beta is a value for normalizing when Per_Max should begin being reduced below 1, and typically has a value between 01 and 1.5.

Still referring to FIG. 7, at step 224 hub 52 determines if the admission group load $S_w$ is greater than a value High_Load. If so, hub 52 decreases Per_Max by an amount Per_Down at step 226, and at step 228 hub 52 transmits Per_Max and waits a period of time equal to a round trip delay (RTD) plus Window_Length before returning to step 222. If at step 224 it is determined that $S_w$ is less than or equal to High_Load, it is then determined at step 228 if Per_Max is less than 1, and if not hub 52 returns to step 222.

If it is determined at step 230 that Per_Max is less than 1, it is then determined at step 232 whether $S_w$ is less than Low_Load. If $S_w$ is not less than Low_Load, hub 52 returns to step 222. If $S_w$ is less than Low_Load, hub 52 increases Per_Max by a value Per_Up at step 234 and step 228 is then performed. At step 228, hub 52 transmits Per_Max and waits an amount of time equal to a round trip transmission delay (RTD) plus time Window_Length before returning to step 222.

In the one embodiment of the invention, Per_Max may be set to one of one hundred and twenty eight values. These one hundred and twenty eight values are represented by a seven bit number Per_Val which is transmitted by hub 52 and which maps to Per_Max by:

$$\text{Per\_Max} = [(0.5)^{1/8}]^{Per\_val} \quad (4)$$

Using this mapping allows Per_Max to be increased a Per_Up value of $1/(0.5)^{1/8} \approx 1.09$ and a Per_Down value of $(0.5)^{1/8} \approx 0.917$ using integer increases or decreases of Per_Val, which can more easily be represented by a seven bit value. Table Ii shows all possible values of Per_Max as a function of Per_Val.

At step 266 $CFA_{adjust}$ which is a correction term which ensures that the transmit power of the terminal will be sufficient even in the worst case situation is calculated using $T_{CFA}(a,s)$ as follows:

$$CFA_{adjust} = -10\log[1 + (1 + \alpha(T_{CFA}(a,s) - 1) - M_{nom})] \cdot \left[\frac{\left[\frac{E_b}{N_0}\right]_{nom}}{\frac{W}{R}}\right] \quad (5)$$

where $\alpha$ is a positive number between 1 and 1.5, W/R is the processing gain and $M_{nom}$ is the desired nominal number of transmissions in the CFA. $[E_b/N_0]_{nom}$ is the minimum bit energy to noise ratio that hub 52 is able to process at an acceptable error rate which is a function of the signal processing capability of hub 52, and in one embodiment of the invention is known to be 7.6 dB. The $N_0$ term of $[E_b/N_0]_{nom}$ can be expressed as $(M-1) \cdot P$ where M is the number of terminals transmitting and P is the power at which the transmission are received at hub 52, (which will be equal in a properly operating system). The $E_b$ term is directly proportional to the power P at which the transmission is received at hub 52.

At step 268 a value $\Delta P$ is calculated as the difference between the average bit energy to noise ratio for the message received $(E_b/N_0(m,a,s))$ and the nominal bit energy to noise ratio $[E_b/N_0]_{nom}$ less the $CFA_{adjust}$ factor, which can be expressed as follows:

$$\Delta P = E_b/N_0^{nom} - E_b/N_0(m,a,s) - CFA_{adjust} \quad (6)$$

where $E_b/N_0^{nom}$, $E_b/N_0(m,a,s)$ are in dB. Subtracting $E_b/N_0^{nom}$ from $E_b/N_0(m,a,s)$ simply yields the difference between the desired or nominal $E_b/N_0$ and the measured average $E_b/N_0$. If the measured average receive $E_b/N_0$ is less than

TABLE I

Per_Max Values

| Per_val most significant 4 bits | | | Per_val least significant 3 bits | | | | |
|---|---|---|---|---|---|---|---|
| | 0.00E+00 | 1.00E+00 | 2.00E+00 | 3.00E+00 | 4.00E+00 | 5.00E+00 | 6.00E+00 | 7.00E+00 |
| 0 | 1.00E+00 | 9.17E-01 | 8.41E-01 | 7.71E-01 | 7.07E-01 | 6.48E-01 | 5.95E-01 | 5.45E-01 |
| 1 | 5.00E-01 | 4.59E-01 | 4.20E-01 | 3.86E-01 | 3.54E-01 | 3.24E-01 | 2.97E-01 | 2.73E-01 |
| 2 | 2.50E-01 | 2.29E-01 | 2.10E-01 | 1.93E-01 | 1.77E-01 | 1.62E-01 | 1.49E-01 | 1.36E-01 |
| 3 | 1.25E-01 | 1.15E-01 | 1.05E-01 | 9.64E-02 | 8.84E-02 | 8.11E-02 | 7.43E-02 | 6.82E-02 |
| 4 | 6.25E-02 | 5.73E-02 | 5.26E-02 | 4.82E-02 | 4.42E-02 | 4.05E-02 | 3.72E-02 | 3.41E-02 |
| 5 | 3.13E-02 | 2.87E-02 | 2.63E-02 | 2.41E-02 | 2.21E-02 | 2.03E-02 | 1.86E-02 | 1.70E-02 |
| 6 | 1.56E-02 | 1.43E-02 | 1.31E-02 | 1.20E-02 | 1.10E-02 | 1.01E-02 | 9.29E-03 | 8.52E-03 |
| 7 | 7.81E-03 | 7.16E-03 | 6.57E-03 | 6.02E-03 | 5.52E-03 | 5.07E-03 | 4.65E-03 | 4.26E-03 |
| 8 | 3.91E-03 | 3.58E-03 | 3.28E-03 | 3.01E-03 | 2.76E-03 | 2.53E-03 | 2.32E-03 | 2.13E-03 |
| 9 | 1.95E-03 | 1.79E-03 | 1.64E-03 | 1.51E-03 | 1.38E-03 | 1.27E-03 | 1.16E-03 | 1.06E-03 |
| 10 | 9.77E-04 | 8.96E-04 | 8.21E-04 | 7.53E-04 | 6.91E-04 | 6.33E-04 | 5.81E-04 | 5.32E-04 |
| 11 | 4.88E-04 | 4.48E-04 | 4.11E-04 | 3.77E-04 | 3.45E-04 | 3.17E-04 | 2.90E-04 | 2.66E-04 |
| 12 | 2.44E-04 | 2.24E-04 | 2.05E-04 | 1.88E-04 | 1.73E-04 | 1.58E-04 | 1.45E-04 | 1.33E-04 |
| 13 | 1.22E-04 | 1.12E-04 | 1.03E-04 | 9.41E-05 | 8.63E-05 | 7.92E-05 | 7.26E-05 | 6.66E-05 |
| 14 | 6.10E-05 | 5.60E-05 | 5.13E-05 | 4.71E-05 | 4.32E-05 | 3.96E-05 | 3.63E-05 | 3.33E-05 |
| 15 | 3.05E-05 | 2.80E-05 | 2.57E-05 | 2.35E-05 | 2.16E-05 | 1.98E-05 | 1.81E-05 | 1.66E-05 |

Figure 8:
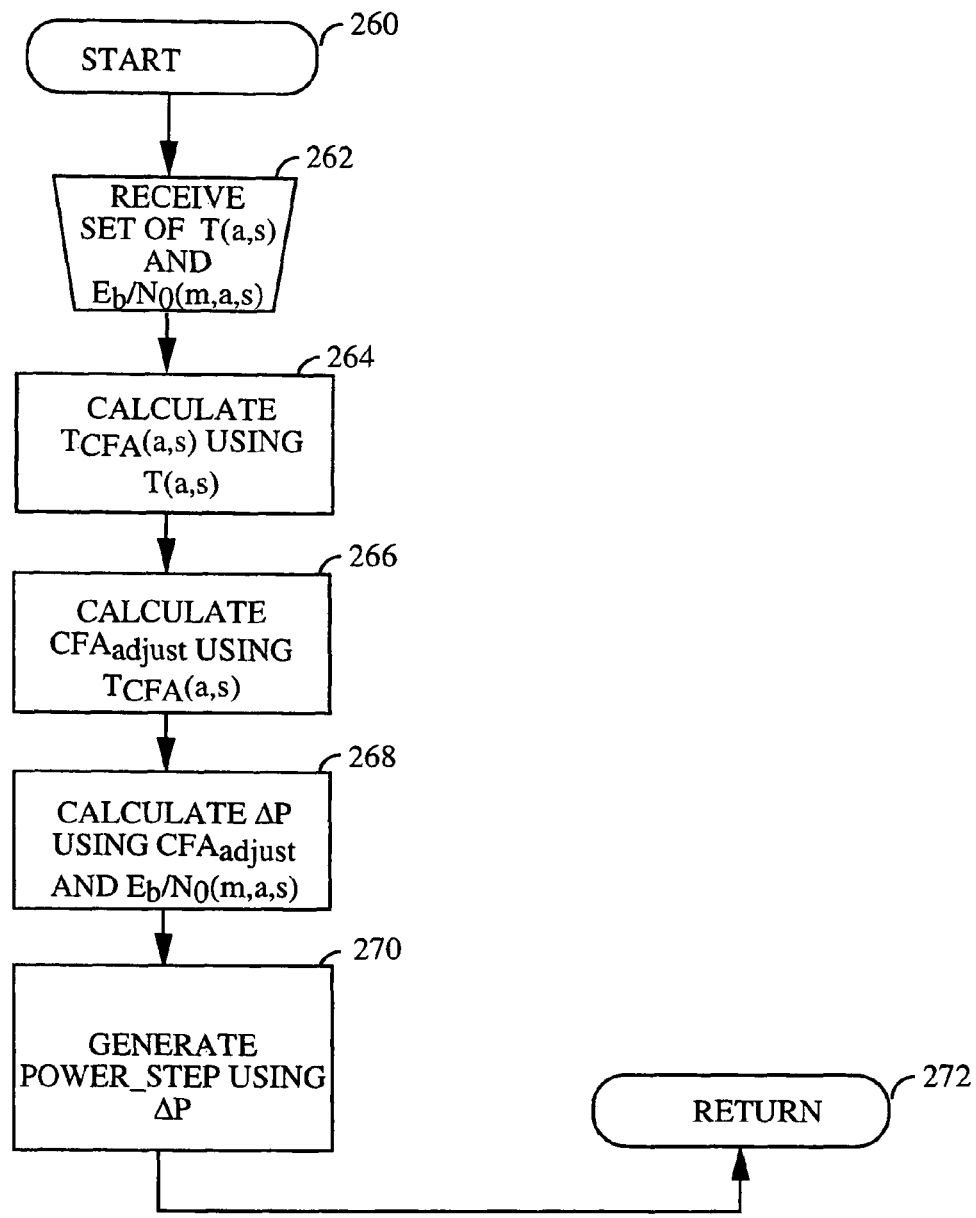
FIG. 8 is a flow diagram illustrating the generation of a power control command.

FIG. 8 is a flow diagram illustrating the steps performed by hub 52 to generate Power_Step in accordance with one embodiment of the invention. The generation of Power_Step begins at step 260 and at step 262 values $T(a,s)$ and $E_b/N_0(m,a,s)$ are received. At step 264 $T_{CFA}(a,s)$ is calculated using $T(a,s)$. $T_{CFA}(a,s)$ is the instantaneous number of transmissions that occur during slot in the CFA associated with access channel a.

the desired $E_b/N_0$, a positive $\Delta P$ results. Conversely, if the measured average receive $E_b/N_0$ is less than the desired $E_b/N_0$, a positive $\Delta P$ results. $CFA_{adjust}$ decreases $\Delta P$ if the number of transmissions in the CFA is above the nominal amount, and increases $\Delta P$ if the number of transmissions in the CFA is below the nominal amount. This is done to ensure that in case that the nominal amount of concurrent transmissions will occur the terminal would be received with sufficient $E_b/N_0$ and so that each terminal is received with an equal power $E_b/N_0{}^{nom}$ which maximizes system performance.

Still referring to FIG. 8, at step 270 the value Power_Step is set using ΔP. If the magnitude of ΔP is greater than 3 dB, Power_Step is set to 3 dB. If the magnitude of ΔP is between 0.5 dB and 3 dB, Power_Step is set to 1 dB. If the magnitude of ΔP is between 0.5 dB and −0.5 dB, Power_Step is set to 0 dB. If the magnitude of ΔP is between −0.5 dB and −3 dB, Power_Step is set to −1 dB. If the magnitude of ΔP is less than −3 dB, Power_Step is set to −3 dB. These An exemplary set of conditions used to set Power_Step are also shown in Table II.

TABLE II

| |ΔP| > 3 dB | Increase/decrease terminal power by 3 dB |
|---|---|
| 0.5 dB ≦ |ΔP| ≦ 3 dB | Increase/decrease terminal power by 1 dB |
| |ΔP| < 0.5 dB | Do not change terminal power |

By setting Power_Step in accordance with the conditions set forth above, the actual transmit power adjustment provided to each terminal 50 is reduced when compared to that measured and indicated by ΔP. Reducing the rate of change acts as a filter for noisy measurements of the average bit-energy to noise ratio and the CFA transmission load TCFA(a, s). Alternative embodiments of the invention may calculate Power_Step in accordance with the principals set forth in Table III.

TABLE III

| ΔP > H$_1$ | Increase terminal power by H$_{LP}$ dB |
|---|---|
| H$_2$ ≦ ΔP ≦ H$_1$ | Increase terminal power by H$_{SP}$ dB |
| −H$_3$ < ΔP < H$_2$ | Do not change terminal power |
| −H$_4$ ≦ ΔP ≦ −H$_3$ | Decrease terminal power by H$_{SM}$ dB |
| ΔP < −H$_4$ | Decrease terminal power by H$_{LM}$ dB |

H$_{LP}$, H$_{SP}$, H$_{SM}$, and H$_{LM}$ as well as H$_1$, H$_2$, H$_3$, and H$_4$ can be determined by simulations. An exemplary set of vales are H$_1$=2.0, H$_2$=0.15, H$_3$=−0.85, H$_4$=−2.85, H$_{LP}$=3.0, H$_{SP}$=1.0, H$_{SM}$=−1.0, and H$_{LM}$=−3.0. The value Power_Step is transmitted to the terminal 50 within the acknowledgment message and in the preferred embodiment of the invention is comprised of a 4 bit value. Upon reception of the acknowledgment message, the terminal 50 adjusts its transmit power according to the value Power_Step up to the amount Power_MaxTx_Max.

Referring again to FIG. 3, hub 52 registers the set of terminals 50 during start up mode 130. In accordance with one embodiment of the invention, power and admission control is performed during the registration by broadcasting a small value of Per_Max that is slowly increased as the number of terminal 50 having registered also increases. This spreads out the registration process over time, and given a sufficient amount of time allows an orderly registration to take place.

As also noted above, in a second embodiment of the invention, registration is performed by polling admission groups. In this second embodiment of the invention the number of groups polled in each admission group is determined by the number of CFA's in each admission group as well as the capacity of the CFA channel. Once the polling is complete, hub 52 generates a polling complete message that causes each terminal 50 to enter normal mode 152. The values X, R and Tx_Max are preferably kept constant during normal operation and adjusted on an as needed basis based on system performance.

Terminal Operation

In accordance with the present invention, a terminal 50 performs various adjustments to its operation in response to the success or failure of data transmission attempts, as well as to the control values received from hub 52 and generated as described above. One adjustment performed by each terminal 50 is to increase or decrease the transmit power at which the reverse link signal is generated. Another, adjustment performed by each terminal is altering the "persistence" (Tx_Per) at which each data message is transmitted from the terminal 50. As noted above, the transmission persistence (Tx_Per) is a value between zero and one, inclusive, that determines the probability of a data message actually being transmitted at a given time.

In accordance with one embodiment of the invention, hub 52 transmits a polling message during start up mode 130 using the overhead paging channel that indicates the polling process is being conducted. Additionally, hub 52 indicates a particular admission group is being polled. A terminal 50 waits for indication that the admission groups with which it is associated is being polled, and once such an indication is received, the terminal 50 transmits access probes to hub 52 at a persistence of one, and a transmit power (Tx_Power) equal to a nominal transmit power (Power_Nom), which in the preferred embodiment of the invention is 22 dBm.

One implementation of the process associated with reverse link timing acquisition and registration is described in copending U.S. patent application Ser. No. 08/558,557 entitled "SIGNAL ACQUISITION VIA REPEATED ACCESS PROBE TRANSMISSION" filed Nov. 30, 1995 and assigned to the assignee of the present invention. Other implementations are well known. As noted above, in an alternative embodiment of the invention, during start up mode, hub 52 may set the maximum persistence Tx_Max to a low level, and each of terminals 50 attempts to register simultaneously by transmitting access probes at the lower maximum persistence level. This second embodiment requires a longer time to complete the registration, but reduces the complexity of the registration process. Once a terminal 50 receives notice from hub 52 that the registration process has been completed, it enters normal mode 152 (FIG. 4).

Figure 9:
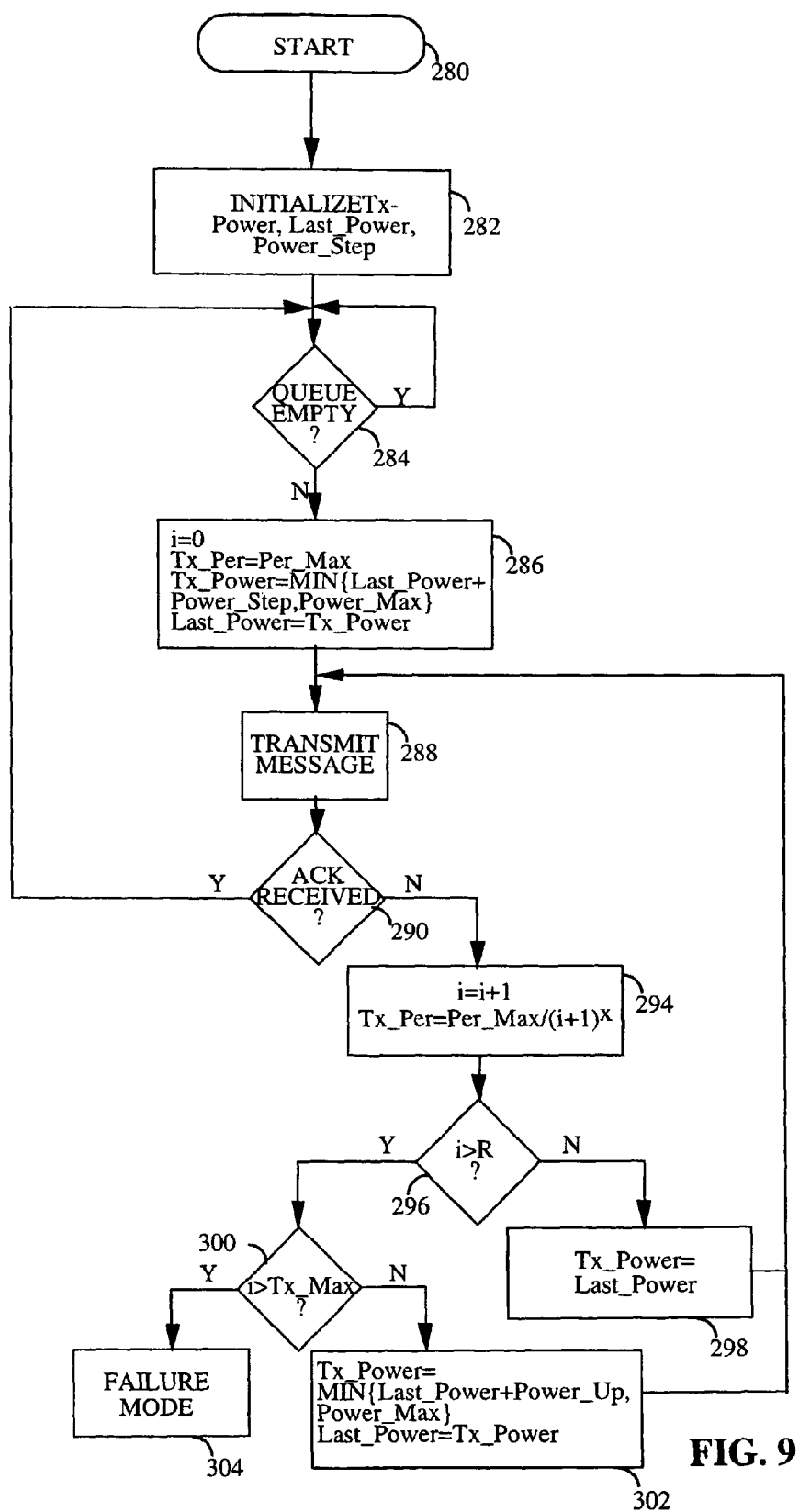
FIG. 9 is a flow diagram illustrating the operation of a terminal during normal mode.

FIG. 9 is a flow chart illustrating the operation of a terminal 50 during normal mode 152 and initial recovery mode 151 in accordance with one embodiment of the invention. At step 282 the variables Tx_Power, Last_Power, and Power_Step are initialized to 22 dBm, 22 dBm, and 0 dB respectively. At step 284 it is determined whether the data queue is empty, and if so step 284 is performed again. If it is determined at step 284 that data is queued for transmission step 286 is performed.

During step 286, backoff counter i is set to 0, the persistence Tx_Per is set to Per_Max, and the transmit power. Tx_Power is set as follows:

$$Tx\_Power = MAX(MIN(Last\_Power + Power\_Step, Power\_Max), Power\_Min). \quad (7)$$

Additionally, Last_Power is updated to Tx_Power. At step 288, the data is transmitted in a message at transmit power Tx_Power and a persistence Tx_Per. At step 290 it is determined if an acknowledgment message was received. If the acknowledgment message was received and step 284 is performed again.

If an acknowledgment message is not received at step 290, a transmission recovery process begins at step 294, during which backoff counter i is incremented and the persistence Tx_Per is reduced to Per_Max/(i+1)$^X$. At step 296, it is determined if backoff counter i is greater than initial recovery threshold R, and if so the transmit power Tx_Power is set to Last_Power at step 298, and the message is transmitted again at step 288. Thus, the data message is retransmitted at the same transmit power Tx_Power but with a lower persistence. Thus, retransmissions are continued at lower persistence levels until backoff counter i is greater than initial recovery threshold R.

If determined at step 296 that backoff counter i is greater than initial recovery threshold R, it is further determined at step 300 whether backoff counter i is greater than maximum retransmissions Tx_Max. If it is determined that backoff counter i is not greater than maximum retransmissions Tx_Max, transmit power Tx_Power is set to the minimum of Last_Power plus Power_Up or Power_Max, and Last_Power is set to the updated Tx_Power at step 302. The data message is then retransmitted using these updated parameters at step 288. Thus, the data message is retransmitted an additional number of times up to Tx_Max at increasing transmit power levels up to maximum transmit power Power_Max.

If at step 300 it is determined that backoff counter i is greater than Tx_Max, then the maximum number of transmissions Tx_Max have been performed without receipt of an acknowledgment message, and terminal 50 enters failure recovery mode 154 at step 306 during which it performs failure recovery.

Figure 10:
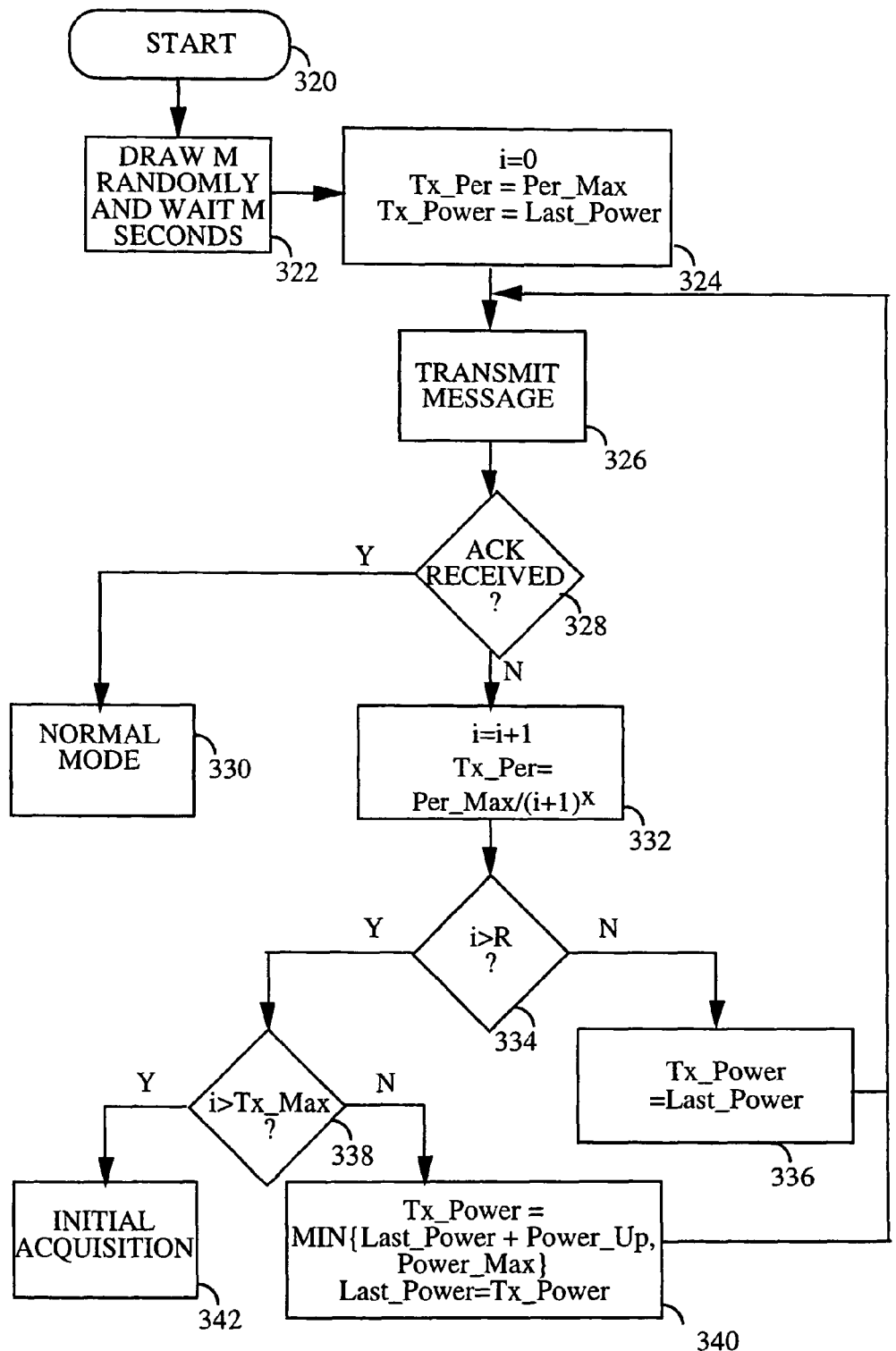
FIG. 10 is a flow diagram illustrating the operation of a terminal during failure recovery mode.

FIG. 10 is a flow diagram illustrating the failure recovery process performed by terminal 50 during failure recovery mode 154 when performed in accordance with one embodiment of the invention. The failure recovery process begins at step 320 and at step 322 terminal 50 waits a random number of seconds M. At step 324, backoff counter i is set to 0, the persistence Tx_Per is set to Per_Max, and the transmit power Tx_Power is set to Last_Power. At step 326, a message is transmitted at the transmit power level Tx_Power with persistence Tx_Per, and at step 328 it is determined if an acknowledgment message was received.

If an acknowledgment message was received, terminal 50 returns to normal mode 152 at step 330. If it is determined at step 328 that no acknowledgment message has been received, backoff counter i is incremented and the persistence Tx_Per is reduced to Per_Max/(i+1)$^X$ at step 332, where as noted above X is a value provided from hub 52. X is a value greater than 1 and preferably less than 2.

At step 334, it is determined whether backoff counter i is greater than initial retry threshold R, and if not, the message is transmitted again at step 326.

If it is determined at step 334 that backoff counter i is greater than initial retry threshold R, it is further determined whether backoff counter i is greater than maximum transmission threshold Tx_Max at step 338. If the backoff counter is not greater than maximum transmission threshold Tx_Max, Tx_Power is set to the minimum of Last_Power+Power_Up or Power_Max, and Last_Power is set to Tx_Power. at step 340.

If it is determined that backoff counter i is greater than maximum retry transmissions Tx_Max at step 338, then the terminal 50 enters initial acquisition mode 150 at step 342. In accordance with one embodiment of the invention, a terminal 50 continues to transmit access probes during initial acquisition mode 150 at maximum transmit power Power_Max and persistence Tx_Per equal to 1 until an acknowledgment message is received so long as the forward link pilot signal from hub 52 is detected.

As also described above, the wireless telecommunications system shown in FIG. 3 utilizes a collocated terminal 51 placed in close proximity to hub 52. The collocated terminal 51 transmits test messages using a Tx_Per of 1 for all transmissions and therefore transmits with the highest persistency at all times. The collocated terminal allows measurements of the satellite transponder frequency offset error and of the round trip transmission delay to take place, and is given this higher priority because these measurements are useful to the operation of the rest of the network, and since there is normally only one collocated terminal in the entire system the additional persistence will not affect the load in the channel significantly. Collocated terminal 51 follows the power control mechanism as described above with reference to a terminals 50.

By having each terminal 50 transmit with a persistence Tx_Per less than or equal to a maximum persistence Per_Max transmitted by hub 52, the above described invention allows hub 52 to maintain the maximal number of transmissions received at $M_{nom}$ by adjusting the value of Per_Max. Maintaining the average number of signaling messages received at $M_{nom}$, in turn, increases the efficiency with which the available RF bandwidth is used, as $M_{nom}$ is set to the maximum number of transmissions that can be properly be processed by hub 52 given the particular signal processing capabilities of hub 52 and without violating emission limits to adjacent satellites of the FCC or other standards bodies.

Similarly, having hub 52 calculate the average bit energy to noise ratio for each message and then transmit a Power_Step in each acknowledgment message maintains the power at which each data message is received at $P_{nom}$ the minimum amount of received power necessary to complete a transmission under full load conditions (i.e., when there are $M_{nom}$ simultaneous terminals transmitting to the hub). A secondary effect from controlling the terminals transmit power such that they are received with an equal power at the hub is that it minimizes the amount of interference created between messages from different terminals 50 and therefore utilizes the full potential of the system capacity. Additionally, having each terminal 50 autonomously reduce the persistence with which it transmits signaling messages when an acknowledgment message is not received allows the system to recover from periods where the number of transmissions exceeds $M_{nom}$ due to random convergence of transmissions.

The proper $P_{nom}$ and $M_{nom}$ are based on the receive processing capability of hub 52. If $(E_b/N_0)_{nom}$ is the required $E_b/N_0$ at the hub to yield an acceptable frame error rate, the required receive power P will vary depending on the number of terminals M transmitting. To allow steady operation, a pair $(M_{nom}, P_{nom})$ are defined as nominal operating point of the admission group.

$M_{nom}$ is determined by the specific satellite channel capacity (i.e., based on the specific satellite's link budget). In an exemplary embodiment, a maximum $M_{nom}$ of 25 simultaneously transmitting terminals can be supported by the satellite in a single CFA. Given the received $E_b/N_T$ of hub 52 can be expressed as:

$$\left(\frac{E_b}{N_T}\right)_i = \frac{W}{R} \frac{P_i}{\sum_{i \neq j} P_j + N} \qquad (8)$$

The nominal $E_b/N_T$ required for an acceptable error rate is $(E_b/N_T)_{nom}$=7.6 dB, where W/R is the processing gain (256), N is the thermal noise power, and $P_j$ is the received power of terminal j. If all terminals are received with equal power P, then the received $E_b/N_T$ of any terminal is $$\left(\frac{E_b}{N_T}\right) = \frac{W}{R} \frac{P}{(M-1)P+N} \quad (9)$$

Solving for P/N we obtain:

$$\left(\frac{P}{N}\right) = \left(\frac{W/R}{E_b/N_T} - (M-1)\right)^{-1} \quad (10)$$

In the exemplary embodiment, $P_{nom}/N$ can be calculated by setting M to $M_{nom}$ ($M_{nom}$=25), W/R=256, and $$\left(\frac{E_b}{N_t}\right) = 7.6 \text{ dB}$$

yielding a $P_{nom}/N$=−13.12 dB where $N_t$ is the total noise i.e., the sum of the thermal noise and the interference from other terminals.

By maintaining the receive power at $P_{nom}$, up to $M_{nom}$ terminals can transmit without error at any given time with high probability. Additionally, if less than $M_{nom}$ terminals are transmitting, then the data messages are transmitted with excess power and therefore with an increased likelihood of proper reception.

Additionally, having each terminal autonomously reduce the persistence with which it transmits signaling messages when an acknowledgment message is not received allows the system to recover from periods where the number of transmissions exceeds $M_{nom}$, due to random convergence of transmissions.

It should be noted that the power and admission control is described above per admission group. If there are more than one admission group in the system, the same power and admission control is employed separately for each admission group.

Thus, a transmit and admission control system for a wireless satellite communication system has been described. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for operating a hub in a satellite based wireless telecommunications system comprising the steps of:
   a) processing a set of data messages transmitted by a set of terminals by way of the satellite;
   b) calculating a maximum persistence that is transmitted to at least a subset of said set of terminals comprising measuring a number of message transmission attempts received during a time window for an admission group and decreasing said maximum persistence if a load ratio is greater than a high load limit and increasing the maximum persistence if the load ratio is less than a low load;
   c) calculating a power step value that is transmitted to a terminal from said set of terminals, comprising measuring a last message received from each terminal and a number of concurrently transmitting terminals;
   d) selecting a persistence for each terminal wherein the selected persistence is less that the maximum persistence; and
   e) performing admission and transmit power control by causing adjusting of a transmit power for each terminal based on the calculated power step value and each terminal to transmit at the selected persistence and adjusted transmit power in accordance with a predetermined procedure.

2. The method as set forth in claim 1 wherein step b) further comprising the step of waiting a time interval equal to a round trip delay plus said time window.

3. The method as set forth in claim 1 wherein step c) is comprised of the steps of:
   c.1) calculating an average bit energy to noise ratio for a transmission from a terminal;
   c.2) calculating an instantaneous load array for a code division multiple access frequency allocation channel;
   c.3) calculating a power step by subtracting a said average bit energy to noise ratio from a nominal bit energy to noise ratio; and
   c.4) transmitting said power step to said terminal.

4. The method as set forth in claim 3, wherein step c.3 is further comprised of subtracting a load adjust factor from said nominal bit energy to noise ratio.

5. The method as set forth in claim 1 wherein the step of measuring a number of message transmission attempts received is comprised of the steps of:
   calculating a set of transmission totals each associated with a corresponding access channel and time slot; and
   summing a subset of said set of transmission totals for access channels associated with said admission group over a set of time slots falling within a time window, including slot transmission from time slots falling partially within said time window.

6. The method as set forth in claim 5 wherein transmissions occurring during time slots falling completely within said timing window are included completely, and transmissions occurring during time slots falling partially with said timing window are included partially.

7. A hub for a wireless telecommunications system comprising:
   a digital signal processing system for generating a set of magnitudes of messages received via sets of access channels during a time slot;
   an admission and transmit power control system for determining a total number of messages received via each access slot above a predetermined threshold during each slot, and for calculating a maximum persistence Per_Max using said total number of messages and decreasing the maximum persistence if a load ratio is greater than a high load limit and increasing the maximum persistence if the load ratio is less than a low load;
   the admission and power control system further comprising determining a power step value transmitted to a terminal from a set of terminals comprising measuring a last message received from each terminal and a number of concurrently transmitted terminals;
   a transmit system for transmitting said maximum persistence Per_Max and the power step value; and
   a processor for causing selecting by a terminal of a persistence and adjusting of a transmit power by a terminal in accordance with a predetermined procedure, whereby the selected persistence by a terminal is no greater than the maximum persistence and the adjusted transmit power for each terminal is based on the power step value.

8. The hub as set forth in claim 7 wherein said control system:
calculates an average bit energy to noise ratio for each access channel using said set of magnitudes; and
calculates the power step by subtracting a nominal bit energy to noise ratio from said average bit energy to noise ratio.

9. The hub as set forth in claim 7 wherein said control system:
calculates a frequency allocation load using said total number of messages; and
adjusts said power step by subtracting an adjust value based on said frequency allocation load.

10. The hub as set forth in claim 9 wherein said control system calculates said adjust value via equation (5) set forth in the specification.

11. An apparatus for operating a hub in a satellite based wireless telecommunications system comprising:
means for processing a set of data messages transmitted for a set of terminals by way of the satellite;
means for calculating a maximum persistence that is transmitted to at least a subset of the set of terminals comprising a means for measuring a number of message transmission attempts received during a time window for an admission group and decreasing the maximum persistence if a load ratio is greater than a high load limit and increasing the maximum persistence if the load ratio is less than a low load;
means for calculating a power step value that is transmitted to a terminal from the set of terminals, comprising measuring a last message received from each terminal and a number of concurrently transmitting terminals;
means for selecting a persistence for each terminal wherein the selected persistence is less that the maximum persistence; and
means for performing admission and transmit power control by causing adjusting of a transmit power for each terminal based on the calculated power step value and each terminal to transmit at the selected persistence and adjusted transmit power in accordance with a predetermined procedure.

12. The system of claim 11 wherein the means for calculating a maximum persistence further comprises a means for providing a waiting time interval equal to a round trip delay plus the time window.

13. The system of claim 11 wherein the means for calculating a power step value comprises:
means for calculating an average bit energy to noise ratio for a transmission from a terminal;
means for calculating an instantaneous load array for a code division multiple access frequency allocation channel;
means for calculating a power step by subtracting the average bit energy to noise ratio from a nominal bit energy to noise ratio; and
means for transmitting the power step to the terminal.

14. The system of claim 13, wherein the means for calculating a power step by subtracting the average bit energy to noise ratio from a nominal bit energy to noise ratio further comprises subtracting a load adjust factor from the nominal bit energy to noise ratio.

15. The system of claim 11 wherein the means for measuring a number of message transmission attempts received comprises:
means for calculating a set of transmission totals each associated with a corresponding access channel and time slot; and
means for summing a subset of said set of transmission totals for access channels associated with the admission group over a set of time slots falling within a time window, including slot transmission from time slots falling partially within the time window.

16. The system of claim 15 wherein transmissions occurring during time slots falling completely within the timing window are included completely, and transmissions occurring during time slots falling partially with the timing window are included partially.

17. A non-transitory computer-executable storage medium comprising program instructions which are computer-executable to operate a hub in a satellite based wireless communication system, the storage medium comprising:
program instructions that cause processing of a set of data messages transmitted for a set of terminals by way of the satellite;
program instructions that cause a calculation of a maximum persistence that is transmitted to at least a subset of the set of terminals comprising program instructions that cause a measurement of a number of message transmission attempts received during a time window for an admission group and decreasing the maximum persistence if a load ratio is greater than a high load limit and increasing the maximum persistence if the load ratio is less than a low load;
program instructions that cause a calculation of a power step value that is transmitted to a terminal from the set of terminals, comprising measuring a last message received from each terminal and a number of concurrently transmitting terminals;
program instructions that cause a selection of a persistence for each terminal wherein the selected persistence is less that the maximum persistence; and
program instructions that cause a performance of an admission and transmit power control by causing adjusting of a transmit power for each terminal based on the calculated power step value and each terminal to transmit at the selected persistence and adjusted transmit power in accordance with a predetermined procedure.

18. The non-transitory computer-executable storage medium of claim 17 wherein the program instructions that cause a calculation of a maximum persistence further comprises program instructions that cause a waiting time interval equal to a round trip delay plus the time window.

19. The non-transitory computer-executable storage medium of claim 17 wherein the program instructions that cause a calculation of a power step value comprises:
program instructions that cause a calculation of an average bit energy to noise ratio for a transmission from a terminal;
program instructions that cause a calculation of an instantaneous load array for a code division multiple access frequency allocation channel;
program instructions that cause a calculation of a power step by subtracting the average bit energy to noise ratio from a nominal bit energy to noise ratio; and
program instructions that cause a transmission of the power step to the terminal.

20. The non-transitory computer-executable storage medium of claim 19, wherein the program instructions that cause a calculation of a power step by subtracting the average bit energy to noise ratio from a nominal bit energy to noise ratio further comprises program instructions that cause a subtraction of a load adjust factor from the nominal bit energy to noise ratio.

21. The non-transitory computer-executable storage medium as set forth in claim 17 wherein the program instructions that cause a measurement of a number of message transmission attempts received comprise:
  program instructions that cause a calculation of a set of transmission totals each associated with a corresponding access channel and time slot; and
  program instructions that cause a sum of a subset of said set of transmission totals for access channels associated with the admission group over a set of time slots falling within a time window, including slot transmission from time slots falling partially within the time window.

22. The non-transitory computer-executable storage medium of claim 21 wherein transmissions occurring during time slots falling completely within the timing window are included completely, and transmissions occurring during time slots falling partially with the timing window are included partially.

\* \* \* \* \*